United States Patent Office 2,779,416
Patented Jan. 29, 1957

2,779,416

TREATING FORMATIONS WITH SOLID FORMING LIQUIDS

Roscoe C. Clark, Jr., Ponca City, Okla., assignor to Stanolind Oil and Gas Company, Tulsa, Okla., a corporation of Delaware No Drawing. Application December 5, 1952, Serial No. 324,405

4 Claims. (Cl. 166—30)

This invention relates to treating formations penetrated by wells. More particularly, it relates to injecting solid-forming liquids into such formations to plug the formations partially or completely.

Many solid-forming liquids have been previously used for the purpose of plugging underground formations. For example, molten materials which solidify upon cooling to formation temperature have been employed. Examples of such materials are sulfur and asphalts. Plastics which set by chemical action have also been used. An example of such a plastic is the reaction product of phenol and formaldehyde. Solutions which form a precipitate due to chemical or physical effects when mixed with formation liquids have also been injected. An example of such a material is a solution of naphthalene in alcohol. Some of these materials and methods have been fairly successful but many have not. Several problems remain to be solved in all of the prior procedures, especially in the method of properly placing these materials at the desired location. This is particularly true in methods in which molten materials are injected into formations. Also, certain of these methods are inefficient principally because of the composition of the materials employed.

If a molten material such as sulfur is introduced into the tubing in a well, it rapidly loses heat and forms a solid film on the tubing surface. This film may eventually become sufficiently thick to plug the tubing. If the sulfur reaches the formation, it freezes as soon as it enters the cool surface thereof and little penetration can be obtained. If an effort is being made to plug a water zone of an oil producing formation, the sulfur may enter the oil zone by accident, sealing off the oil as well as the water.

When a precipitate is formed by mixing an injected solution with liquids in the formation, little control is possible since precipitation depends upon variable conditions such as the degree of mixing in formations of variable porosity and permeability and variations in the nature and quantity of formation liquids and gases.

In view of the above problems, it is an object of this invention to provide an improved method of injecting solid-forming liquids into formations penetrated by wells. A more specific object is to provide an improved method of plugging non-oil producing formations. Another specific object is to provide an improved method and composition for plugging a formation in a well with a molten plugging agent. An additional specific object is to provide a method for plugging a non-oil producing zone which permits unplugging of oil zones into which the plugging agent is accidentally injected. Still another object is to provide a simplified method of insuring the existence of permeability in a formation after injection of a solid-forming liquid.

In general, I accomplish the objects of my invention by first emulsifying the solid-forming liquid in a continuous aqueous phase. I have found that if such an emulsion is prepared so that solids form in the injected zone in an amount equal to or more than about 35% by volume of the total emulsion, substantially complete plugging occurs. However, if sufficient of the immiscible liquid is employed to prevent the formation of solids equal to more than about 35 percent of the emulsion, then the formation into which the plugging emulsion is injected retains a part of its permeability. If this principle is applied to the use of molten materials for plugging non-oil producing zones of oil producing formations, it is possible to avoid permanent plugging of the oil zones. By use of an oil-soluble, water-insoluble plugging agent, such as as molten naphthalene, emulsified in water amounting to more than about 65% of the emulsion, both the oil zone and the other zones remain slightly permeable after such treatment. Therefore, if the well is produced after the plugging operation, the oil flowing through the oil zone washes out the oil-soluble plugging agent, usually completely restoring the permeability of this zone. The water and gas zones, on the other hand, retain injected solidified naphthalene and therefore remain relatively impermeable. A second treatment then substantially completely plugs the water and gas zones while again leaving the oil zone sufficiently permeable to permit the oil to dissolve the plugging agent from this zone. In every case, solids equal to at least about 10 percent of the emulsion volume should be caused to form in the zone to be plugged in order to avoid an unnecessarily large number of treatments to achieve substantially complete plugging of this zone.

Another advantage of using an emulsion of a molten plugging agent such as naphthalene in water is that the water can be employed as a convenient means for transporting the plugging agent to the bottom of the well. The method involves transporting the naphthalene as a cold suspension of solid particles of naphthalene in the water. Thus, all heat loss problems are avoided and all tendency of a molten material to stick to the tubing walls is eliminated. This suspension is then heated near the bottom of the well to produce the desired emulsion of molten plugging agent in water. Preferably, a low-freezing-point material should be employed to reduce the amount of bottom hole heat required. Such a low-freezing-point material may be formed conveniently by mixing two plugging agents such as naphthalene and paradichlorobenzene to obtain the desired melting point.

The presence of water also allows the use of a convenient heating means. This means consists of placing magnesium near the bottom of the well and acidifying the water mixed with the plugging agent so that when the water passes over the magnesium, a reaction occurs which heats the suspension to a temperature above the melting point of the plugging agent. To avoid premature setting of the molten material in the formation due to premature cooling, it is generally advisable to inject a heated liquid, such as water, into the formation ahead of the emuslified plugging agent. Preferably the volume of heated liquid should be about the same as the volume of emulsion and the temperature should be about the same as the emulsion temperature. Water may be conveniently heated by acidifying and passing over the same magnesium employed to heat the emulsion.

The principle of emulsification is also applicable to the use of precipitated solids for plugging. For example, if a hot concentrated solution of plugging material such as naphthalene in a water-insoluble solvent such as kerosene is employed, as more fully described and claimed in S. N. 339,160 filed February 26, 1953, by George C. Howard, it may be of advantage to emulsify the solution with water to control the amount of initial permeability in the plugged zones to permit clearing of the oil zones by subsequent flow of oil through these zones. Water also provides a convenient means for heating such solutions at the bottom of the hole since the water can be acidified and passed over magnesium as previously described. This permits introduction of the solvent and solute into the well as a suspension of solid material in liquid. When the mixture is heated near the bottom of the well, the solid solute goes into solution in the hot solvent. When the term "solid-forming liquid" is employed hereinafter, the term is intended to mean liquids from which a solid is formed either by precipitation from a solution, or by freezing of molten materials, due to cooling of the emulsion to formation temperature at formation pressure.

Referring now in more detail to the application of this method to the use of molten materials for plugging formations, it is apparent that the method is applicable to many molten plugging agents. I prefer, however, to employ oil-soluble, water-insoluble materials since these substances can be selectively removed from oil zones. Most organic materials in pure or impure form can be used. Examples of natural impure materials are paraffin, ozokerite, fats, waxes, rosins and the like. Pure materials are preferred because of their definite melting points. Examples of such materials are the higher molecular weight hydrocarbons, acids, aldehydes, alcohols, ketones, ethers, esters, amines and mercaptans. These can be used alone if one of the compounds with a suitable freezing point can be found, or a mixture can be used to obtain a desired freezing point. As previously noted, in order to avoid excessive heat losses, and to permit use of bottom-hole heating means with limited heating capacity, it is highly desirable that a low-freezing-point material be employed. I have found that if a freezing point is selected within the range of about 5° to 30° F. above the formation temperature, and if the plugging material is injected at a temperature at least about 30° F. above the freezing point of the plugging material, a plug extending as much as 5 feet or more from the well can be obtained before the plugging agent cools sufficiently to prevent further injection thereof. A plug extending even farther from the well can be formed if the emulsion is preceded by a hot liquid as previously described.

Although I greatly prefer to employ these low-freezing-point materials in an emulsion with water, it will be apparent that they can also be employed with advantage in an unemulsified form in many cases. For example, due to the low freezing point of the material, it can be pumped as a liquid at temperatures much closer to well temperatures than materials proposed in the prior art. For this reason, heat losses are much smaller, often permitting pumping of the molten material through several thousand feet of tubing in a well before sufficient heat is lost to cause freezing of the liquid. Thus, in shallow wells, particularly those less than about 1000 feet in depth and having small temperature increase with depth, the plugging material can be heated at the surface in emulsified or unemulsified form and pumped down the tubing and into the formation to be plugged without the use of bottom-hole heat, and without difficulty from freezing of the material in the tubing.

Preferred examples of mixtures of materials for plugging operations are paradichlorobenzene with naphthalene and mixtures of naphthalene with benzene. A mixture of naphthalene and benzene with carbon tetrachloride may also be employed with advantage since the latter material controls the inflammability of the mixture as well as providing a liquid phase to aid in preventing complete plugging of the oil zones. The freezing points of mixtures of naphthalene and paradichlorobenzene are presented in the following table.

TABLE I

Freezing temperatures of mixtures of naphthalene and paradichlorobenzene

| Percent Naphthalene, by weight | Freezing Temperatures, ° F. at 0 p. s. i. g. |
| --- | --- |
| 100 | 175 |
| 90 | 164 |
| 80 | 152 |
| 70 | 140 |
| 60 | 127 |
| 50 | 113 |
| 40 | 98 |
| 30 | 88 |
| 20 | 103 |
| 10 | 115 |
| 0 | 127 |

Pressure has an effect on the freezing temperature. In general, each 1000 p. s. i. increase in pressure increases the freezing temperature by about 2° F.

The freezing points of mixtures of naphthalene and benzene are presented in the following table.

TABLE II

Freezing temperatures of mixtures of naphthalene and benzene

| Percent Benzene, by Weight | Freezing Temperatures, ° F. at 0 p. s. i. g. |
| --- | --- |
| 0 | 175 |
| 10 | 161 |
| 20 | 147 |
| 30 | 131 |
| 40 | 116 |

The effect of pressure on these freezing temperatures is about the same as for naphthalene and paradichlorobenzene. The mixture is operable, but presents a fire hazard due to the inflammable nature of the benzene mixture. The inflammability can be virtually eliminated by substitution of carbon tetrachloride for about half of the benzene. An important effect of adding more than about 20 percent of such a mixture of benzene and carbon tetrachloride to naphthalene is the existence of a liquid phase when the mixture freezes. This liquid should be taken into account when calculating the amount of water to be added, less water being required to prevent solidification of 35 percent or more of the emulsion.

The freezing temperatures and the amount of liquid remaining at freezing temperatures of mixtures of naphthalene, benzene and carbon tetrachloride are indicated in Table III. The mixtures of benzene and carbon tetrachloride referred to in this table contain equal quantities of the two liquids.

TABLE III

Data regarding mixtures of naphthalene, benzene and carbon tetrachloride

| Percent Benzene-Carbon Tetrachloride Mixture, by Weight | Freezing Temperature, ° F. at 0 p. s. i. g. | Percent by Volume of Material Remaining Liquid at 0 p. s. i. g. |
| --- | --- | --- |
| 0 | 175 | 0 |
| 10 | 163 | 0 |
| 20 | 154 | 6 |
| 30 | 146 | 13 |
| 40 | 138 | 23 |
| 50 | 131 | 33 |
| 60 | 125 | 43 |
| 70 | 119 | 53 |
| 80 | 114 | 62 |
| 90 | 109 | 71 |

It is to be noted that these mixtures have considerable sublimation vapor pressures. Therefore, if they are to be employed for plugging gas zones, care should be exercised to insure complete elimination of permeability either by a single treatment, or by at least two partial plugging actions to avoid flow of gas through the plugging mass with consequent slow removal of the plugging agent from the gas zone. On the other hand, this phenomenom is of considerable importance when plugging water zones of gas-producing formations since it permits clearing of gas zones into which the plugging agent may be accidentally injected.

As pointed out above, the use of bottom hole heat is advantageous in that it permits injection of the plugging agent as a cold suspension avoiding all heat losses. Such a suspension can be formed conveniently by melting the plugging agent at the surface and emulsifying the liquid in a suitable amount of water. A satisfactory emulsifying agent has been found to be polyoxyethylene anhydrosorbitol monooleate containing about 20 oxyethylene groups per molecule. This material can be obtained as Tween 80 from the Atlas Powder Company. Other emulsifying agents which produce an oil-in-water type of emulsion can, of course, be employed if desired. After the emulsion of molten plugging agent in water has been formed, it should be cooled while stirring to form a suspension of finely divided solid plugging agent in water.

I have found that this suspension should be pumped down the tubing at a rate of at least about 2 feet per second, to provide sufficient turbulence to prevent excessive settling of the solid particles. The rate of 2 feet per second corresponds to about 0.5 barrel per minute in 2 inch external-upset-end tubing or 0.7 barrel per minute in 2½ inch external-upset-end tubing. A pumping rate of about 1.0 barrel per minute is usually preferred.

The bottom-hole heating can be provided by any convenient means. For example, an electric heater can be employed. Purely physical heating means may also be used, such as circulating hot water or steam as described in U. S. Patent 2,341,572 issued to Reed. It is preferred, however, to employ chemical means for producing heat such as is taught by U. S. Patent 1,736,440 issued to Hall. This patent teaches the use of caustic and aluminum to generate heat. Such a reaction is, of course, greatly facilitated by the presence of water. The unique and highly favorable scheme which I prefer to use, however, has been mentioned above and consists of acidifying the water phase and passing this material over magnesium, preferably in the form of rods placed near the zone to be plugged.

The amount of magnesium to be used depends upon several factors such as the shape of the magnesium, strength of acid, quantity of plugging material present, bottom-hole pressure and temperature, and rate of flow of the acid past the magnesium. In order to avoid complex calculations in each case, it is suggested that about 150 ft. of ⅞ inch diameter magnesium rod be employed in 2 inch tubing and about 200 ft. of the rod be used in 2½″ tubing. If the water phase of the suspension contains from about 5 to 10 percent hydrochloric acid, and less than about 50 percent plugging agent is present, an adequate safety factor is provided for all combinations of variables at rates of flow in the range suggested to maintain a uniform suspension. This amount of magnesium is also adequate to heat acidified water employed as a preheating liquid if the amount of water is approximately equal to the volume of plugging emulsion. If a preheating liquid is to be employed, the nature of the liquid is not critical. However, water is greatly preferred since it is cheap, does not tend to dissolve the plugging material, and when acidified, can be conveniently heated by passing over the same magnesium rods employed to heat the suspension of plugging material in water.

When the above method is employed to plug zones of wells, it is usually advisable to use an amount of plugging material which will permit the plugged zones to retain some permeability so that the flow of oil in the oil zones will wash out the plugging agent. It is possible, however, and often desirable, to inject a material which will form an impermeable zone when the zone to be plugged can be defined with sufficient accuracy. In such case the constituents of the emulsion are so proportioned that solids are formed exceeding 35 percent by volume of the emulsion.

In plugging off water zones it is usually necessary to form a plug extending at least about 5 feet back into the formation to prevent bypassing of the plug by the water. For an average formation with less than about 30 per cent porosity, a plugging emulsion volume of about 200 gallons per vertical foot of water or gas zone exposed to the well should be employed. It has been found advisable to limit the thickness of the zone treated at one time to about 10 feet or less. This limits the volume of emulsion to about 2000 gallons, which can be handled conveniently, and also insures more uniform distribution of the plugging agent than is possible if plugging of a thicker zone is attempted in a single operation. Still more uniform distribution can be obtained by including in the emulsion bridging materials such as those described in U. S. Patent 2,573,690 issued to Cardwell et al.

My invention will be better understood by reference to the following example.

*Example*

A number of tests were conducted to determine the effectiveness of both naphthalene-paradichlorobenzene and naphthalene-benzene-carbon tetrachloride systems for sealing cores. Part of the cores were natural sandstone, part were limestone, and part were synthetic cores formed by setting mixtures of sand and cement. All cores were set in methyl methacrylate polymer (Lucite) sheaths with threaded ends to permit making connections for flow of liquids through the cores.

Two series of tests were made. In the first, the cores were saturated with water after which kerosene was injected until a constant injection rate and pressure were obtained, demonstrating that the water was decreased to an irreducible minimum amount similar to what would be present in an oil-producing formation. A hot emulsion of plugging agent was then injected, preceded by an equal volume of hot water. The temperature of the water and of the emulsion was about 30° F. above the freezing temperature of the plugging agent. The plugging agent was then allowed to cool and freeze in the core. Kerosene was then caused to flow back through the core if possible, as would occur in an oil-zone of a producing formation. After the kerosene injection rate and pressure had reached a constant value, the permeability to kerosene was measured and compared to the permeability before the plugging operation.

In the second series of tests, the core was saturated with water to simulate a water-producing zone of a formation. The permeability to water was then measured. A hot emulsion of plugging agent and water was next injected, preceded by an equal volume of hot water. Again the temperature of the hot water and emulsion was about 30° F. above the freezing temperature of the plugging agent. After the plugging agent had cooled and solidified, an effort was made to pump water back through the core. If the core was permeable, the permeability to water was usually measured and the core was subjected to a second plugging operation. The results of these series of tests are presented in the following table:

TABLE IV

Results of small scale selective plugging tests

| Test No. | Plugging Material | Water, percent by Vol. | Description of Core | Length of Core, inches | Core Saturated With | Initial Perm. of Core md. | Plugging Materials Freezing Temp., °F. | Plugging Materials Percent Solids by Vol. | Final Perm. (md) After Backflow to Kerosene | Final Perm. (md) After Backflow to Water | Stages Req'd. |
|---|---|---|---|---|---|---|---|---|---|---|---|
| 1 | 5% C₆H₆—CCl₄ mix / 95% naphthalene | None | Sandstone | 2 | kerosene¹ / water | 150 | 170 | 100 | 0 | 0 | |
| 2 | Same as 1 | 50 | do | 2 | kerosene¹ / water | 132 | 170 | 50 | 0 | 0 | |
| 3 | Same as 1 | 67 | do | 2 | kerosene¹ / water | 147 / 147 | 170 / 170 | 33 / 33 | 147 | 6.6 (95.5% reduction) | 1 |
| 4 | 60% C₆H₆—CCl₄ mix / 40% naphthalene | 40 | Sand: Cement | 12 / 12 | kerosene¹ / water | 502 / 640 | 125 / 125 | 33 / 33 | 502 | 28.8 (95% reduction) | 3 / 1 |
| 5 | 37% C₆H₆—CCl₄ mix / 63% naphthalene | 60 | do | 12 / 12 | kerosene¹ / water | 722 / 722 | 140 / 140 | 33 / 33 | 722 | 7.3 (99%) reduction | 1 |
| 6 | 78% C₆H₆—CCl₄ mix / 22% naphthalene | 20 | Acidized Limestone | 14 / 14 | kerosene¹ / water | 18,500 / 18,500 | 115 / 115 | 33 / 33 | 18,500 / 0 | 0 | 2 |
| 7 | 50% paradichlorobenzene / 50% naphthalene | 67 | do | 14 / 14 | kerosene¹ / water | 18,500 / 18,500 | 115 / 115 | 33 / 33 | 18,500 / 0 | 0 | 2 |
| 8 | Same as 7 | 60 | do | 14 / 14 | kerosene¹ / water | 18,500 / 18,500 | 115 / 115 | 40 / 40 | 18,500 / 0 | 0 | 1 |

¹ Core saturated with kerosene and "irreducible minimum" water.

NOTE.—Cores Nos. 1 to 6, incl., plugged with naphthalene-benzene-carbon tetrachloride; cores Nos. 7 and 8 plugged with naphthalene-paradichlorobenzene.

The above data demonstrate that if less than about 35 percent of the volume of emulsion of plugging agent solidifies, the plug remains slightly permeable. If, on the other hand, more than about 35 percent of the emulsion solidifies, even the highly permeable limestone cores were completely plugged. The data also show that kerosene backflow usually restored the entire permeability of the core. Thus, there is assurance that the flow of oil through a partially plugged oil zone will clear that zone of plugging material. It will be noted that three plugging operations were performed on core number 4, each operation being followed by a kerosene backwash step. The final permeability was the same as before the plugging operations. This means that the oil zone can be partially plugged any number of times without destroying the permeability so long as the oil is permitted to dissolve out the plugging material between operations. Another point which is to be noted in Table IV is the ability of two partial plugging operations to reduce the permeability of a water zone to an immeasurably low value.

From the above description and example it will be apparent that the proposed materials and methods accomplish the objects of my invention. Water and gas zones can be conveniently plugged without plugging oil zones. By use of the preferred low-freezing-point materials and bottom-hole heating method, the problems of providing a molten plugging material at the bottom of a well are solved. Improved means for conducting the plugging material to the bottom of the well, placing it in the formation, and controlling the final permeability are provided at reduced cost. The same is true for partial plugging of porous zones in secondary recovery operations.

I claim:

1. The method of selectively plugging a non-oil-producing zone of an oil-producing formation penetrated by a well, comprising injecting into said formation an emulsion consisting essentially of water and an oil-soluble, water-insoluble plugging agent non-reactive with said formation, said emulsion being at a temperature above the freezing point of said plugging agent at formation pressure and said freezing point of said plugging agent being above formation temperature, whereby said plugging agent enters said formation as a liquid but freezes to a solid state upon cooling to formation temperature, at least 65 percent of the volume of said emulsion being water, whereby the formation retains some of its permeability so that oil flowing through any oil-producing zone, when the well is produced, dissolves the resulting solidified plugging agent in said oil-producing zone, thus restoring the original permeability of the latter while leaving the non-oil-producing zone partially plugged.

2. The method of claim 1 in which said plugging agent is naphthalene and the formation temperature is not over 170° F.

3. The method of claim 1 in which said plugging agent is a mixture of naphthalene and paradichlorobenzene and the formation temperature is not over 170° F.

4. The method of claim 1 in which said well is produced for a sufficient time to restore at least most of the original permeability of any oil-producing zone and the plugging and producing steps are repeated whereby said non-oil-producing zone is plugged more completely than by the first plugging step, while the repeated flow of oil flowing through the oil-producing zone again restores its original permeability.

References Cited in the file of this patent

UNITED STATES PATENTS

| | | |
|---|---|---|
| 1,307,027 | Swan | June 17, 1919 |
| 1,379,657 | Swan | May 31, 1921 |
| 2,032,826 | Ambrose et al. | Mar. 3, 1936 |
| 2,034,347 | Loomis et al. | Mar. 17, 1936 |
| 2,138,713 | Sullivan | Nov. 29, 1938 |
| 2,258,829 | Berge et al. | Oct. 14, 1941 |
| 2,272,673 | Kennedy | Feb. 10, 1942 |
| 2,378,235 | Miles | June 12, 1945 |
| 2,614,635 | Williams | Oct. 21, 1952 |

OTHER REFERENCES

Acidizing Handbook, Kingston, 1947, page 47.